W. M. KREMENTZ

WRIST WATCH BRACELET

May 30, 1933.

Re. 18,847

Original Filed April 10, 1929

INVENTOR

Walter M. Krementz

BY

Hervey Barber & McKee,

ATTORNEYS

Reissued May 30, 1933

Re. 18,847

UNITED STATES PATENT OFFICE

WALTER M. KREMENTZ, OF NEWARK, NEW JERSEY, ASSIGNOR TO KREMENTZ & COMPANY, OF NEWARK, NEW JERSEY, A CORPORATION OF NEW JERSEY

WRIST-WATCH BRACELET

Original No. 1,779,068, dated October 21, 1930, Serial No. 353,914, filed April 10, 1929. Application for reissue filed June 1, 1932. Serial No. 614,837.

This invention relates to wrist watch bands or bracelets, of the type worn about the wrist for the ornamental effect produced, in addition to its sustaining features.

One of the objects of the present invention is to provide a flexible bracelet composed of ornamental links connected one to another midway in their length by integral loops and provided with members at opposite ends of the chain adapted to connect with the watch or other article to be secured.

A further feature is in the provision of a bracelet chain composed of two sections having means for aggregate length adjustment therebetween, whereby the chain may be used conveniently and comfortably on wrists of different circumferential sizes.

Another purpose is to produce a fastening means for the ends of each section, whereby they are held in close proximity and prevented from relative movement when adjusted for length, and further maintained against separation when the engaging means are detached.

These several objects, together with others such as simplicity, strength, smoothness and neatness of appearance, are attained by the novel construction and combination of parts hereinafter described and shown in the annexed drawing, forming a material part of this disclosure, and in which.

Figure 1:
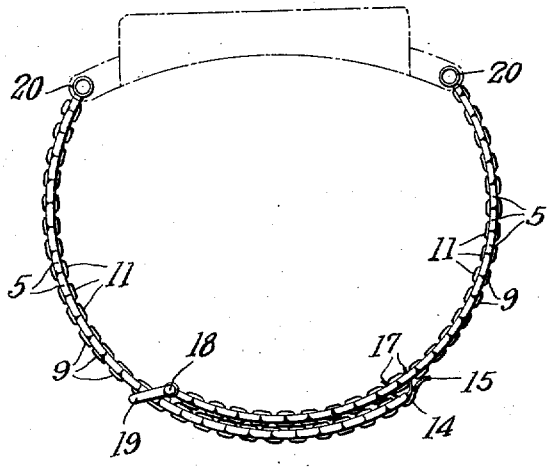
Figure 1 is an edge view of a bracelet made in accordance with the invention, showing the adjusting device and indicating its application.

The links are stamped from flat sheet metal to produce an oblong blank having solid ends 5 provided with slightly rounded corners 6 at their opposite side edges, the ends being integrally connected at one of their side edges by a bar 7 of rectangular cross section, equivalent in thickness to the ends 5.

Also extending integrally between the ends 5, opposite to the bars 7, are flat extensions reduced to one half or less than the thickness of the ends, these extensions being curved, as at 8, to straight side elements 9, then looped at 10 to blend into opposite side elements 11, parallel with the sides 9 and then infolded at 12 to surround the bars 7 of the next adjacent links, forming in effect an oval loop, the adjoining edges 13 of which may be soldered.

At the terminal link of the overlying or outer chain section, in place of forming a loop of the extension, the material is bent into a clip 14 shaped to extend partially over the second adjacent link and presenting a curved forwardly projecting member 15 easily raised by the finger of a wearer.

Figure 2:
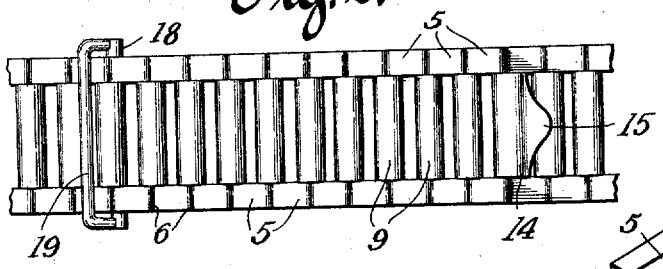
Figure 2 is a partial plan view of the bracelet chain at the portion doubled for length adjustment, drawn to an increased scale.
Figure 4:
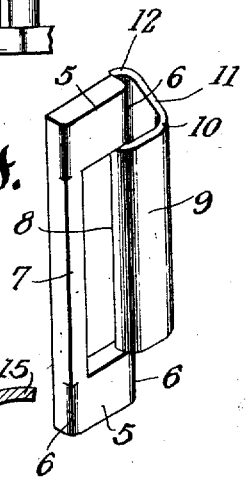
Figure 4 is a perspective view of one of the chain links in detail.
Figure 3:
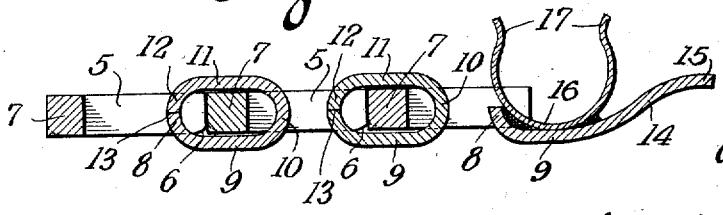
Figure 3 is a further enlarged longitudinal section of the chain at the clip connection member.

On the inner side of the clip extension 9 is soldered a thin spring fork 16 having opposed prongs 17 adapted to resiliently engage over any selected loop in the underlying or inner chain section, as indicated in Figs. 1 and 2, effectively holding the chain sections in adjustment.

At the corresponding end of the underlying chain section, a bar 18 is fixed in the terminal link, and carried by this bar is a flat loop 19 through which the overlying chain section is passed to move freely therein; the loop 19, however, is so proportioned as to prevent passage of the clip-carried fork 16 and therefore one section cannot be released from the other, although relatively adjustable, such adjustment being limited to the length of the sections only and can be made in distances equal to the spacing of the links.

The opposite ends of the chain sections are provided with bars 20 or like devices to engage with the article to be supported, as indicated in Figure 1.

It is to be noted that the link ends 5 are so proportioned as to make contact one with another, presenting uniformly smooth inner and outer surfaces and also straight end edges, conducive to good appearance and in avoiding the seizure of articles brought into contact, as the sleeves, gloves and apparel of the wearer.

While certain preferred embodiments of this device have been shown and described, it will be understood that changes in the form, arrangements, proportions, sizes and details thereof may be made without departing from the scope of the invention as defined in the appended claims.

This application is for the reissue of Letters Patent No. 1,779,068 granted October 21, 1930.

I claim:

1. A flexible bracelet comprised of links united to form two distinct chains arranged in partially overlapping relation, a loop at the end of one chain through which the other freely passes, and a fork having spring prongs at the end of the second named chain to be selectively engaged with any of the links of the first chain.

2. A bracelet composed of two relatively slidable superposed chains of link construction, a guide loop at the end of the inner chain through which the outer chain is slidable, a fork having opposed prongs arranged transversely at the end of the outer chain to resiliently engage any of the links in the inner chain, and a clip combined with said fork by which it is operated.

3. A bracelet composed of two relatively slidable superposed chains of link construction, a transverse guide loop pivoted at the end of the inner chain to slidably receive the outer chain, and means at the end of the outer chain to selectively and positively engage any of the links of the inner chain, said engaging means preventing separation of the chains.

4. A chain bracelet of link construction composed of two sections relatively outer and inner, means on the end of the inner section to slidably confine the outer section, means on the opposite end of the outer section to positively engage the links of the inner section selectively whereby the sections are held juxtaposed in length adjustment, and means for manually operating said adjusting means.

5. A flexible bracelet comprising links united to form two relatively slidable superposed chains arranged in partially overlapping relation, a guide loop at the end of one chain through which the other chain is freely slidable, means on the end of the slidable chain to selectively and positively engage any of the links on the other chain whereby the said chains are held in position as to length adjustment, and means for manually operating said adjusting means.

6. A bracelet comprising two highly flexible non-resilient members arranged in partially overlapping relationship, and means for varying the degree of said overlapping to adjust said bracelet to the wearer, said means comprising means adjacent the overlapping end of the inner of said members for slidably engaging the outer of said members, the overlapping end of said outer member remaining free for grasping to effect the adjustment, and means adjacent said overlapping end of said outer member for securing the same directly to said inner member when the adjustment is complete.

7. A bracelet comprising two highly flexible non-resilient members arranged in partially overlapping relationship, and means for varying the degree of said overlapping to adjust said bracelet to the wearer, said means comprising means adjacent the overlapping end of the inner of said members for slidably engaging the outer of said members, the overlapping end of said outer member remaining free for grasping to effect the adjustment, and means adjacent said overlapping end of said outer member for securing the same directly to said inner member when the adjustment is complete, said last mentioned means being adapted to prevent separation of said members when not secured in adjusted position.

8. A bracelet comprising two highly flexible non-resilient members, one of said members having a loop at its end, the other of said members passed through said loop to overlap said first member and having means adjacent its overlapping end for detachably and adjustably securing the same directly to said first member.

9. A bracelet comprising two relatively slidable superposed highly flexible non-resilient members, a guide loop adjacent the end of the lower member to slidably receive the upper member, and means adjacent the end of the upper member to selectively and detachably engage the body of the lower member, said engaging means being adapted to prevent the end of the upper member adjacent to which it is attached from passing through said loop.

10. A bracelet comprising a pair of overlapping highly flexible non-resilient strap ends, a loop pivotally secured to the end of one strap to receive and slidably engage the overstrap, said loop-carrying strap having a series of longitudinally spaced openings, and engaging means on the overlapping end of the said overstrap adapted to selectively engage said openings, and adapted to be free of said first mentioned strap when disengaged.

11. A bracelet comprising a pair of overlapping highly flexible non-resilient strap ends, a loop pivotally secured to the end of one strap to receive and slidably engage the overstrap, said loop-carrying strap having a series of longitudinally spaced openings, and engaging means on the overlapping end of the said overstrap adapted to selectively engage said openings, and adapted to be free of said first mentioned strap when disengaged, said loop and said engaging means being so proportioned as to prevent said straps from being separated at their overlapping ends.

In testimony whereof, I have signed my name to this specification this 25th day of May, 1932.

WALTER M. KREMENTZ.